Figure 1:
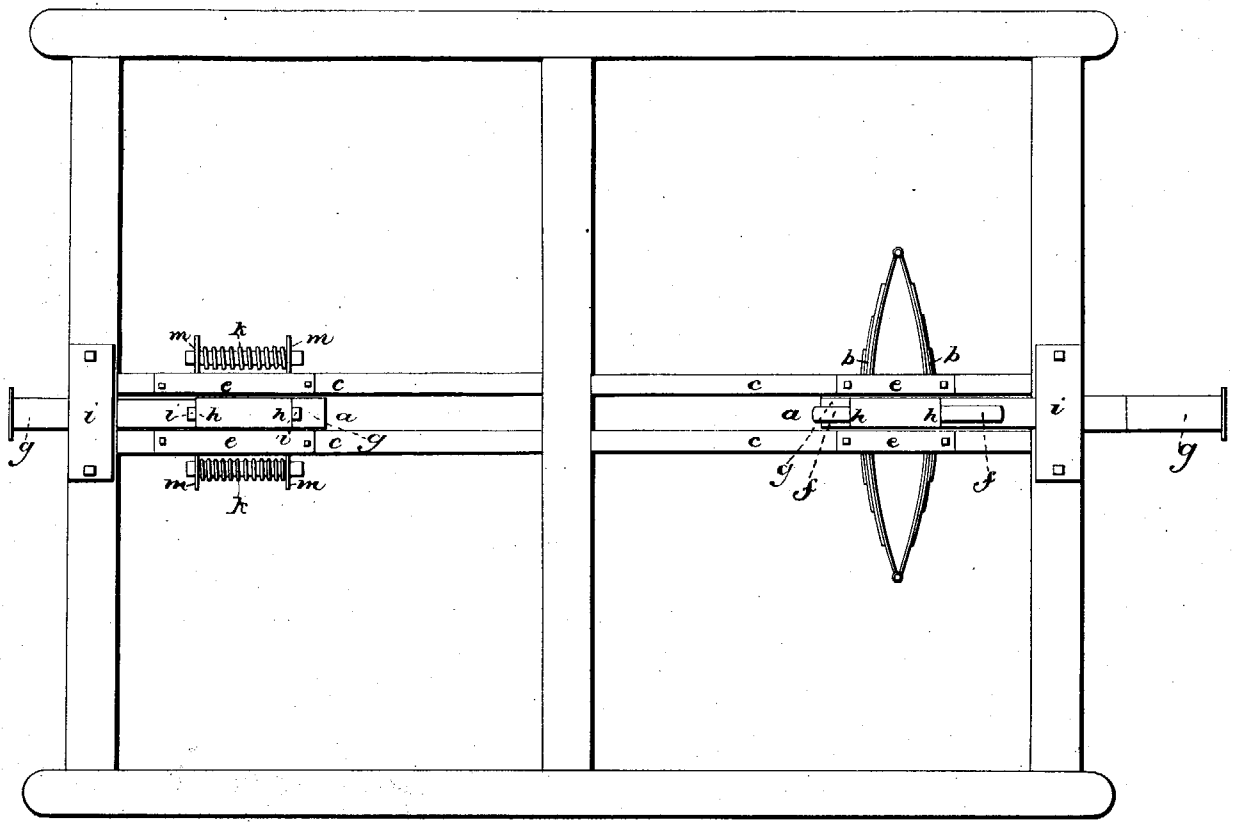
Figure 2:
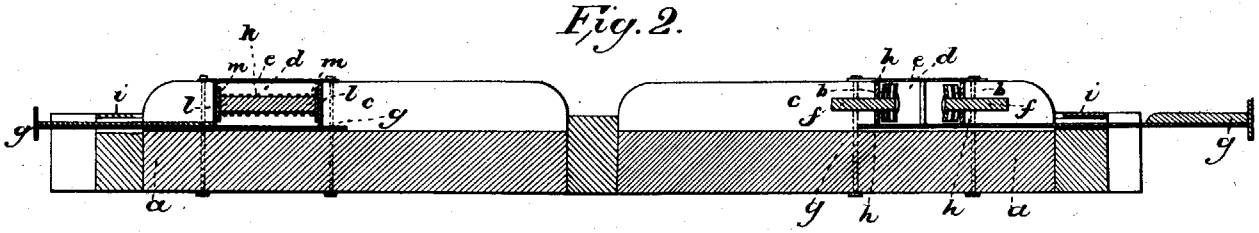

C. DAVENPORT.

Bumper for Railway Cars.

Patented Sept. 9, 1835.

9071X

Witnesses:

R. Ufley

Ezra Lincoln Jr.

Inventor:

Charles Davenport.

9-9-1835 Sept. 9. 1835 17

Charles Davenport Cambridge Mass. 9071X

Letters Patent

The Schedule referred to in these Letters Patent and making part of the same containing a description in the words of the said Charles Davenport himself of his improvement in Rail Road Cars by means of Springs for easing the motion or shock produced at the moment of stopping or of starting.

To all to whom these presents shall come. Be it known that I Charles Davenport of Cambridge in the County of Middlesex and State of Massachusetts have invented a new and useful improvement in Rail road Cars by means of Springs for easing the motion or shock produced at the moment of Stopping or of Starting, and that the following is a full and exact description of the construction and operation of the said machine as invented or improved by me.

As my improvement is to be applied by connecting the cars, in such a manner as to ease the first shock of motion or rest, it is used between each couple, by being secured to the middle piece running through the frame of the carriage, or what is commonly termed the perch in coaches. The manner of constructing these Springs and their requisite fixtures, I conduct in the following manner. At about two and a half feet from the end of the middle piece and on the top thereof I secure across it or in the direction of the width of the frame two connected semi circular springs or those known as elliptical ones by means of [illegible] pieces of plank of abt nine inches high bolted firmly on the middle piece one [illegible] each side. The springs are let into these pieces as low down as to be about flush with the top and there secured by means of a strap bolted across, and the opening is to be sufficiently long to admit the full play of the springs.

They are are [illegible] semicircle to consist of as many leaves as may be requisite for the strength, and through the centre of each an opening is to be made, to admit a rod of about six inches in length, through the whole thickness of leaves, & which is to be riveted or otherwise secured on the inside so that the rod projects entirely from the outside of each elliptical half and stands firm. A long flat bar is placed beneath these springs to rest and slide backwards

9671X and forwards upon the middle piece and directly beneath them upon the top of
the springs is also laid along another flat piece, of sufficient length to embrace the
whole dilatation or expansion of them and also to allow its ends to be bent down
the width of them, and then to be secured to the bar below thus forming a square
loop enclosing the centre of them. A hole is to be made through each bent end
of this loop, directly opposite to the rod, and which is intended to play easily [illegible]
backwards or forwards on this rod which is passed through it for that purpose
The other end of the flat bar projects beyond
the carriage frame as far as may be necessary & has a pin or hook or other
contrivance by which the connection with the other car is to be effected. In the
operation of these springs the shock which for example we will suppose to be that
of starting causes the end of the bar furnished with the hook or pin for connection
to be drawn out in the foremost car this of course brings back the square loop with
it, causing it to press against the outside of the front semicircle and thereby bring it
back also, at the same time the back or hinder spring pressing against the open
-ing in the plank cannot recede, but the loop passes on along the rod by means
of the opening left for that purpose and which rods must be equal in length to
the play of the springs say ab^t six inches so that the hole in the loop cannot pass
over the ends of either rod. The reverse mode of operation will attend the other
shock or that of stopping. A strap or square loop is also to pass over the connect
ing end of the bar so as to retain it in sliding in its proper position on the middle
piece. These springs may be used to every car or only alternately.
The same effect may be produced by using spiral
instead of the elliptical springs, and in this case the opening in the side pieces is
made much longer, so as to admit a long spiral spring to lay horizontally therein
having a sufficient cavity in the coil to receive a rod as long as the opening which
keeps the coil straight. As many of these spring coils may be used as are thought
necessary but in general three will answer well one at each side and one in
the middle. The long flat bar is the same & also the square loop but which must
be as long as the opening or length of the springs. Through the hole in the middle is
secured a rod by rivetting or otherwise for the central spiral to contract on & of
the same length as the others. A short flat bar is also placed across the end of the
square loop one at each end or from one side of the openings in the planks to the other 9071X 19.

These bars have each as many holes in, as rods or springs are used, & these bars play by means of these holes up & down the rods. The remaining fixtures are the same in both cases. In the operation of this plan, the shock produced by stor-ing will draw back the flat bar and square loop, and with it also the forward short flat bar; which at each end slides down the rod and contracts the spring which is resisted at the other end but the middle rod being fast in the loop is drawn back and passes through the hole through the short bar at the opposite end thereby contracting its spring also.

What I claim as my invention in the above described machine and not before used is the application of the one spring acting both ways or in other words the combination and construction made use of to provide against either shock in starting or stopping, by the action of the springs either from front or from behind. In testimony that the above is a full and exact description of the construction and operation of my machine as invented or improved by me I have hereunto set my hand this thirty first day of July Eighteen hundred and thirty five

Charles Davenport

Recd. [illegible]

Witnesses
C. H. W. Wharton
Henry Stone 1326 words (Drawing)

(Patented Sept. 9. 1835)